P. K. DEDERICK.
HORSE-POWER.

No. 171,000.  Patented Dec. 14, 1875.

Witnesses:
A. Bennewendorf.
C. Sedgwick

Inventor:
P. K. Dederick
per Munn & Co.
Attorneys.

UNITED STATES PATENT OFFICE.

PETER K. DEDERICK, OF ALBANY, NEW YORK.

IMPROVEMENT IN HORSE-POWERS.

Specification forming part of Letters Patent No. 171,000, dated December 14, 1875; application filed January 18, 1873.

*To all whom it may concern:*

Be it known that I, PETER K. DEDERICK, of Albany, in the county of Albany and State of New York, have invented a new and Improved Horse-Power, of which the following is a specification:

The invention consists in the improvement of horse-power hoisters, as hereinafter described, and pointed out in the claim.

Figure 1:
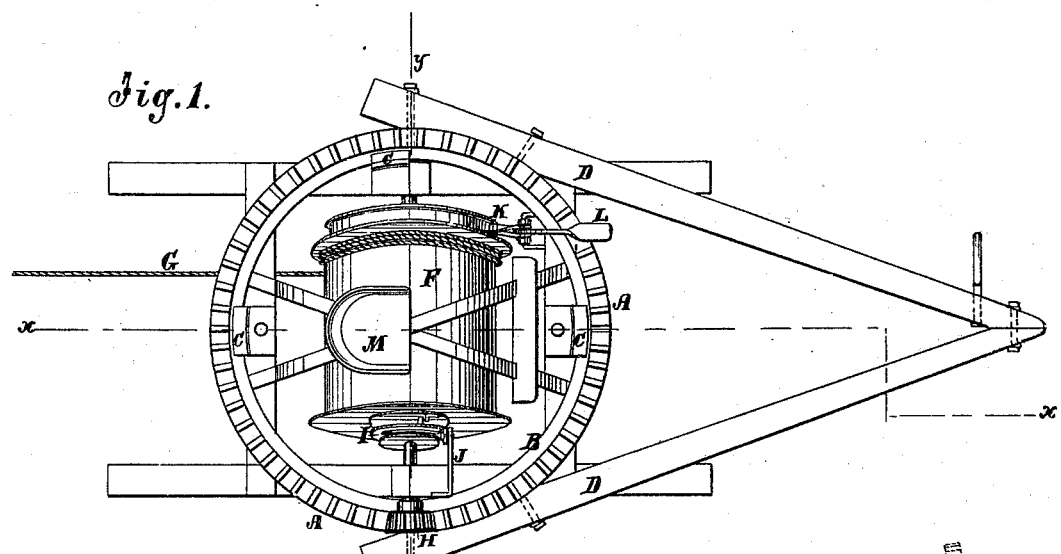
Figures 2, 4:
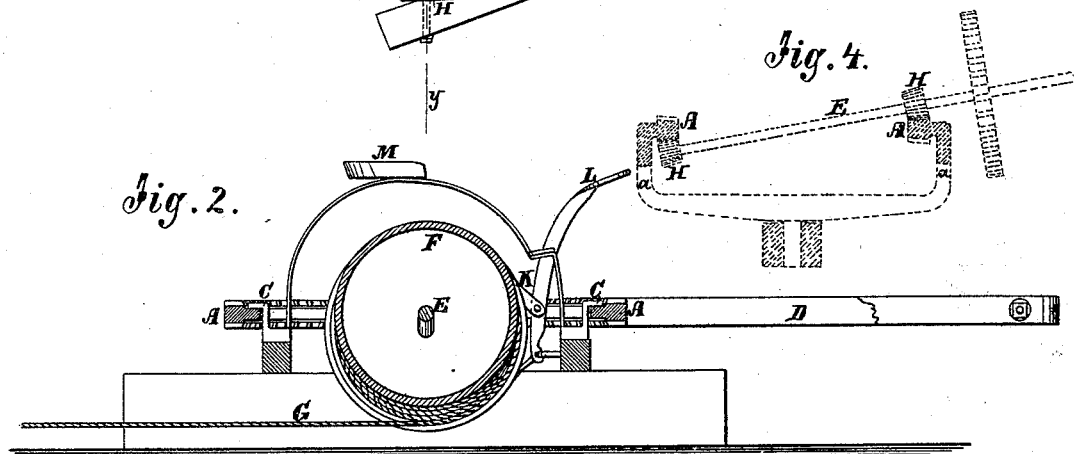
Figure 3:
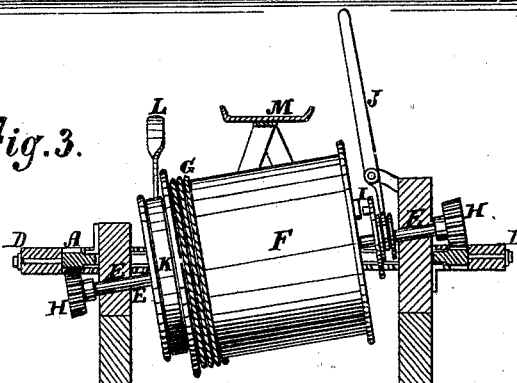

Figure 1 is a plan view of my improved power apparatus. Fig. 2 is a sectional elevation, taken on the line $x\ x$ of Fig. 1. Fig. 3 is a sectional elevation, taken on the line $y\ y$. Fig. 4 is a modification in dotted lines, showing how the driving-wheel may be employed on a driving-shaft.

Similar letters of reference indicate corresponding parts.

A represents the armless driving-wheel, which consists of a mere rim with teeth on both sides, and, in this case, with a slight flange, B, on the inner periphery, which runs in guides C; or it may be roller-guides, or any other suitable means for supporting and guiding it, attached to the platform. D represents the sweeps attached to the outer periphery of the wheel. E is the counter-shaft for transmitting motion from the driving-wheel. In this case it carries a drum, F, for working the rope G of a hoisting-machine This shaft extends from one side of the driving-wheel to the other, across the middle space left free by the absence of arms, as aforesaid, and it crosses the plane of the wheel A obliquely at the center, so that its pinion H at one end gears with the teeth on one side, while the corresponding pinion at the other end gears with the teeth on the other side, in such manner that the transmission by one shaft is effected at two opposite points, both of the wheel and the shaft, so that I obtain all the advantages, in respect of dividing the strain, with one counter-shaft, for which two have heretofore been used; and I have the further advantage of placing the counter-shaft in the space surrounded by the wheel. The clutch I and its lever J, also the brake K and brake-lever L, are thus brought within the wheel, and, the seat M for the attendant being arranged over the drum and the center of the said space, make the apparatus very compact, and so that the attendant has it as much in command as the ordinary steam hoisting-powers, while being, at the same time, in position to command the team as well, if not better, than in any other.

By gearing the drive-wheel and counter-shaft in this way, so that the crowd at one side is balanced by that of the other, the necessity for strong supports for the drive-wheel is considerably lessened, it being only necessary to have such as will keep it in place in the way indicated in the drawing.

For utilizing this contrivance for getting up motion for driving thrashing-machines, saws, or the like, another shaft may be placed under the drive, with a pinion gearing with a spur-wheel on the drum or its shaft, and extending beyond the platform to gear, by a pulley and belt, with the machinery to be driven. It may also be utilized for transmitting motion from or to a shaft by supporting the rim on the shaft by bent arms $a$, connected to its outer periphery, as represented in Fig. 4.

Having thus described my invention, I claim as new and desire to secure by Letters Patent—

The combination of the annular horizontal wheel A, guide C, and supporting-frame with the inclined counter-shaft E and drum F, arranged within the wheel A, and with the lever L pivoted to the supporting-frame inside of the wheel A, and projecting up through to a point convenient to the driver, and the strap $k$ passing around the drum, substantially as described.

PETER K. DEDERICK.

Witnesses:
 A. M. DEDERICK,
 DAVID DETIERE.